United States Patent
Coile et al.

(10) Patent No.: US 8,499,094 B2
(45) Date of Patent: Jul. 30, 2013

(54) MODIFICATION OF SMALL COMPUTER SYSTEM INTERFACE COMMANDS TO EXCHANGE DATA WITH A NETWORKED STORAGE DEVICE USING AT ATTACHMENT OVER ETHERNET

(75) Inventors: Brantley Coile, Athens, GA (US); Samuel Hopkins, Colbert, GA (US)

(73) Assignee: Coraid, Inc., Redwood City, CA (US)

( * ) Notice: Subject to any disclaimer, the term of this patent is extended or adjusted under 35 U.S.C. 154(b) by 211 days.

(21) Appl. No.: 13/027,079

(22) Filed: Feb. 14, 2011

(65) Prior Publication Data
US 2011/0219141 A1    Sep. 8, 2011

Related U.S. Application Data

(60) Provisional application No. 61/310,689, filed on Mar. 4, 2010.

(51) Int. Cl.
*G06F 15/16*    (2006.01)

(52) U.S. Cl.
USPC .......................................................... 709/235

(58) Field of Classification Search
USPC ........................ 709/245, 233, 235
See application file for complete search history.

(56) References Cited

U.S. PATENT DOCUMENTS

| 2002/0114340 A1* | 8/2002 | Kumazawa et al. | 370/412 |
| 2003/0099197 A1 | 5/2003 | Yokota et al. | |
| 2004/0019734 A1* | 1/2004 | Day et al. | 710/315 |
| 2004/0148396 A1 | 7/2004 | Meyer et al. | |
| 2007/0294459 A1* | 12/2007 | Chen | 710/315 |
| 2009/0257350 A1 | 10/2009 | Bugenhagen | |
| 2009/0296699 A1* | 12/2009 | Hefty | 370/389 |

OTHER PUBLICATIONS

PCT International Search Report and Written Opinion, PCT Application No. PCT/US11/24939, May 2, 2011, 13 pages.

* cited by examiner

*Primary Examiner* — Benjamin R Bruckart
*Assistant Examiner* — SM Rahman
(74) *Attorney, Agent, or Firm* — Fenwick & West LLP

(57) ABSTRACT

A process executed by a computing device uses commands having a first format to exchange data through a network with a storage device configured to execute commands having a second format. A storage device controller identifies a command type associated with a command received from the process and identifies one or more physical memory addresses associated with the command. The storage device controller identifies a command having a second format associated with the received command and generates a network request including the command having the second format, the one or more physical memory addresses, a device identifier associated with the storage device and a tag. The network request is transmitted through a network to the storage device which executes the command having the second format. For example, an AoE request including an ATA command is generated from a received SCSI command.

15 Claims, 6 Drawing Sheets

MODIFICATION OF SMALL COMPUTER SYSTEM INTERFACE COMMANDS TO EXCHANGE DATA WITH A NETWORKED STORAGE DEVICE USING AT ATTACHMENT OVER ETHERNET

CROSS-REFERENCE TO RELATED APPLICATIONS

This application claims the benefit of U.S. Provisional Application No. 61/310,689, filed Mar. 4, 2010, the content of which is incorporated by reference herein in its entirety.

BACKGROUND OF THE INVENTION

1. Field of the Invention

The present invention relates to exchanging data with a storage device via a packet-switched network by generating an AT Attachment over Ethernet ("AoE") request from a Small Computer System Interface Command ("SCSI") command.

2. Description of the Related Arts

Computing devices conventionally use a bus, such as a peripheral bus, to couple a processor to other devices such as storage devices, network controllers, input devices or output devices. The bus communicates data and/or commands between the processor and other devices coupled to the bus. Different computing devices may use command formats may be used to communicate with devices attached to the bus. For example, when accessing a hard disk, a computing device may use commands formatted using the AT Attachment ("ATA") standard or Small Computer System Interface ("SCSI") standard.

Commonly, devices which are coupled to the bus are selected based on the command format used by the bus. For example, if a computing device uses a SCSI bus, devices attached to the bus are typically also configured to receive and execute SCSI commands. Similarly, if a bus uses ATA commands, devices attached to the bus are likely also configured to receive and execute ATA commands. Differences between command formats make it difficult for a bus to communicate commands to a device configured to operate using a different format. For example, ATA devices are unable to effectively execute received SCSI commands.

Current network technology now allows a bus to communicate with remote devices, such as storage devices, through a network without impairing performance. This allows the devices to be physically remote from the computing device, beneficially simplifying modification of the devices attached to the bus and allowing more effective disaster recovery by enabling data to be more readily replicated between various devices remote from the computing device. However, to communicate with devices attached through a network, commands from the bus are often modified into a format better suited for transmission over a network. For example, SCSI commands are often reformatted into the iSCSI protocol or into the Fibre Channel over Ethernet (FCoE) Protocol for transmission via Transmission Control Protocol/Internet Protocol ("TCP/IP").

Commonly, storage devices such as hard disk drives, are attached to a bus through a network, allowing remote data storage and replication of data among various storage devices. Many storage devices are Serial Advanced Technology Attachment ("SATA") storage devices, which have a lower cost than SCSI storage devices and use a simpler AT Attachment ("ATA") format for performing operations. Because the SCSI format is designed to operation with a variety of devices other than storage devices, such as scanners or printers, SCSI commands have a larger amount of overhead than the ATA commands because of the complexity of the SCSI protocol. Additionally, transmission of SCSI commands over TCP/IP networks using the iSCSI protocol introduces additional overhead to implement TCP/IP functionality. Similarly, transmission of SCSI commands through a network using FCoE requires customized network components because of FCoE's derivation from a system having guaranteed packet delivery.

Use of ATA commands, which are specialized for use with storage devices, rather than SCSI commands simplifies communication with a storage device through a network. In particular, the AT Attachment over Ethernet (AoE) protocol simplifies transmission of ATA commands from a bus to a storage device through a network and transmission of data from a storage device to a computing device through a network. Unlike iSCSI and FCoE protocols, which encapsulate a command in the SCSI command set then further encapsulate the SCSI command in a transmission protocol, AoE allows transmission of ATA commands through a packet-switched network with minimal overhead. For example, in addition to a 12-byte ATA command and data associated with the ATA command, an AoE data packet, or "request," includes an overhead of 36 bytes used for an Ethernet frame preamble, an Ethernet header, an AoE header and Ethernet frame CRC data. Although AoE simplifies communication of ATA commands to a storage device through a network, many computing devices, or processes executed on a computing device, rely on SCSI commands for communication with storage devices, making access to a storage device through a network more complex.

SUMMARY OF THE INVENTION

Embodiments of the present invention include a method for generating, from a command having a first format, a network request which includes a command having a second format. For example, an AT Attachment over Ethernet ("AoE") request including an AT Attachment ("ATA") command is generated from a Small Computer System Interface ("SCSI") command. This beneficially allows a process or device using SCSI commands to exchange data through a network with a storage device configured to execute ATA commands. By generating AoE requests, the security of the exchanged data is increased while network resources are more efficiently used because of the minimal overhead included in the AoE requests.

In one embodiment, a command type is associated with the command having the first format. For example, an opcode in a SCSI command is extracted and used to identify the SCSI command type. Additionally, a SCSI command is also associated with a scatter/gather list including pointers identifying memory addresses associated with the SCSI command. Because the scatter/gather list may use virtual memory addresses, physical memory addresses or other memory identifiers, physical memory addresses associated with the pointers in the scatter/gather list are determined. Each physical memory address is associated with an identifier. An ATA command, or a command having a format other than the SCSI command, associated with the SCSI command type is identified, and a network request including a destination identifier, a tag, the ATA command and one or more identifiers associated with the physical memory addresses is generated. In one embodiment, the network request is an AoE request including an Ethernet header, an AoE header, an ATA header and the one or more identifiers associated with the physical memory addresses. The device identifier and tag are stored and associated with each other to allow subsequently received data to be paired with an AoE request. The network request is stored in a transmission queue and subsequently transmitted to a device associated with the device identifier via a network.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

DETAILED DESCRIPTION OF EMBODIMENTS

The Figures and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying Figures. It is noted that wherever practicable similar or like reference numbers may be used in the Figures and may indicate similar or like functionality. The Figures depict embodiments of the present invention for purposes of illustration only. One skilled in the art will readily recognize from the following description that alternative embodiments of the structures and methods illustrated herein may be employed without departing from the principles of the invention described herein.

Example System Overview

Figure 1:
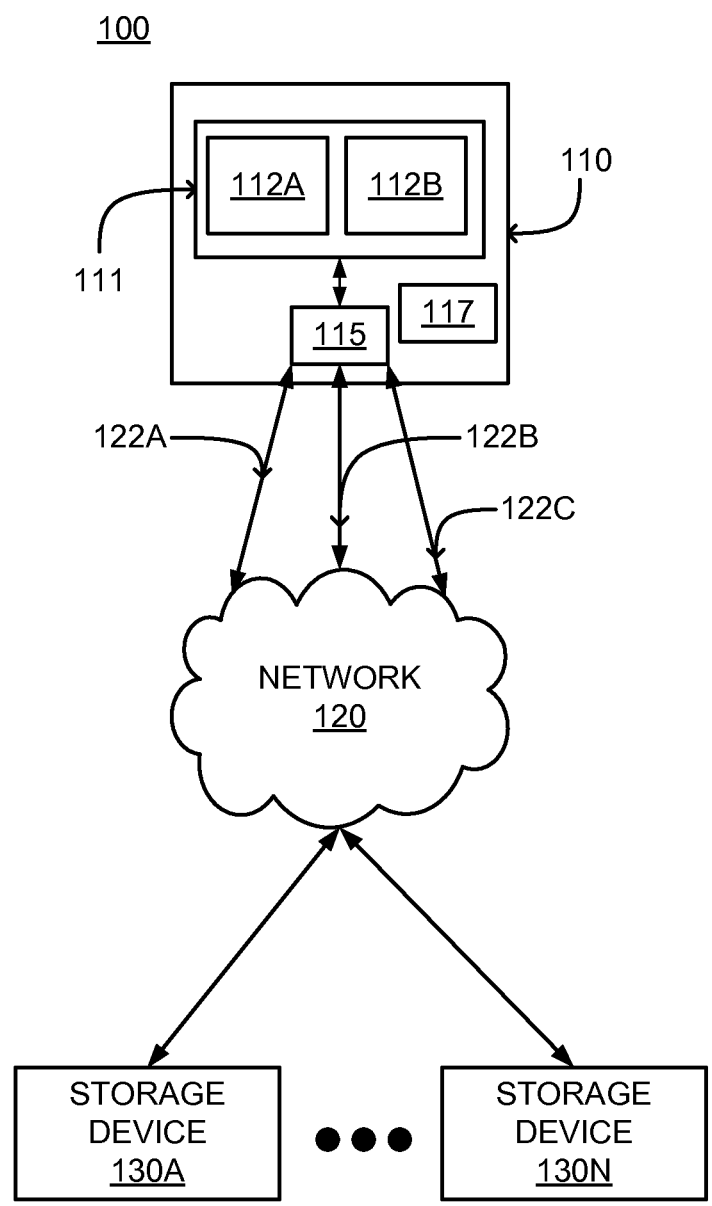
FIG. 1 is a block diagram of a system in which network requests including commands having a second format are generated from commands having a first format and transmitted through a network according to one embodiment.

FIG. 1 shows a block diagram of one embodiment of a system 100 in which network requests including commands having a second format are generated from commands having a different first format. The system 100 includes a computing device 110, a network 120 and one or more storage devices 130A, 130N. For purposes of illustration, FIG. 1 shows a system 100 including two storage devices 130A, 130N, although in other embodiments the system 100 may include more or fewer storage devices 130.

The computing device 110 includes a processor 111, a storage device controller 115 and a memory 117. The processor 111 performs one or more processes 112A, 112B by executing instructions or other executable code from the memory 117 or from a storage device 130. The processes 112 read data from the memory 117, or from the storage device 130, or write data to the memory 117, or to the storage device 130. For purposes of illustration, FIG. 1 shows two processes 112A, 112B performed by the processor 110, although in other embodiments a greater or lesser number of processes 112 are performed by the processor 111. Examples of processes 112 include applications, operating systems, and virtual machines. The memory 117 comprises a non-persistent storage device such as dynamic random access memory (DRAM), static random access memory (SRAM) or similar storage device or other computer-readable storage medium. In one embodiment, the memory 117 also includes a persistent storage device such as flash memory or a magnetic computer storage device.

The storage device controller 115 communicates data and/or commands between the computing device 110 and one or more storage devices 130 via the network 120. In one embodiment, the storage device controller 115 includes a memory having instructions or other executable code that, when executed by the processor 111, exchange data between a process 112 executed by the processor 111 and one or more storage devices 130. For example, the storage device controller 115 transmits read requests to a storage device 130 to retrieve data from the storage device 130 or transmits write requests to a storage device 130 to store data in the storage device 130. The storage device controller 115 may also transmit other commands affecting operation of the storage device 130, such as "reserve-request" commands or other command types. In one embodiment, the storage device controller 115 includes instructions or other executable code that, when executed by the processor 111, receives a command from a process 112 having a first format and generates a network request from the received command which includes a command having a second format. For example, responsive to receiving a SCSI command from a process 112A to write data to a storage device 130A, the storage device controller 115 generates one or more requests, including an ATA write command, using the AoE protocol, "AoE requests," and transmits the AoE packets to the storage device 130A via the network 120. Based on the contents of the one or more AoE requests, the storage device 130A performs the ATA write command to store data included in the AoE request and transmits an acknowledgement message and/or data, such as an AoE packet, to the storage device controller 115 through the network 120. The storage device controller 115 associates the received AoE packet with the corresponding SCSI command to provide an acknowledgement to the process 112A that the data was written to the storage device 130A. Hence, in one implementation, the storage device controller 115 receives a Small Computing System Interface ("SCSI") command from a process 112 and generates an AT Attachment over Ethernet ("AoE") request including an AT Attachment ("ATA") command corresponding to the received SCSI command.

As shown in FIG. 1, the storage device controller 115 is coupled to the network 120 by one or more paths 122A, 122B, 122C. In one embodiment, each path 122A, 122B, 122C is associated with a port, a network interface controller, or other device which is coupled to the network 120 and communicates data or instructions. Multiple paths 122A, 122B, 122C coupling the storage device controller 115 to the network 120 allow the storage device controller 115 to reduce data, or command, transmission time by allocating different AoE requests, or other data, to different paths 122 for transmission to a storage device 130.

By generating an AoE request from a received SCSI command and communicating the AoE request to a storage device 130 through the network 120, the storage device controller 115 allow processes 112, or computing systems 110, using SCSI commands for communication with storage devices 130 to access data stored using Serial AT Attachment ("SATA") storage devices 130. As many processes 112, such as virtual machines, use SCSI commands for communication with devices, generation of AoE requests from SCSI commands increases the types of storage devices 130 accessible by the processes 112. Additionally, enabling processes or computing devices using SCSI commands to communicate with lower-cost SATA storage devices 130 may also reduce the overall cost of the system 100.

Further, transmitting AoE requests corresponding to a SCSI command improves communication through the network 120 between the computing device 110 and a storage device 130. Using AoE requests allows the storage device controller 115 to minimize the overhead included in data communicated between the computing device 110 and the storage device 130. Additionally, transmission of AoE requests corresponding to SCSI commands preserves the security of data communicated between the computing device 110 and the storage device 130 because AoE requests are unable to be routed. Generation of an AoE request from a received SCSI command and transmission of the AoE request to a storage device 130 via the network 120 is further described below in conjunction with FIGS. 2-6. Further, while many of the examples presented herein describe generation of an AoE request from a SCSI command, the methods described herein are also suitable for generating various types of network requests which include a command having a second format that differs from the first format of a received command.

The network 120 comprises any combination of local area and/or wide area packet-switched networks. The network 120 may use wired communication methods, wireless communication methods or a combination of wired and wireless communication methods to transmit data and/or instructions between the computing device 110 and one or more storage devices 130A, 130N. The network 120 and storage device controller 115 allow one or more processes 112 to operate as if the storage devices 130A, 130N are locally attached to the processor 111, when the storage devices 130A, 130N are physically remote from the computing device 110. In one embodiment, the network 120 functions as a dedicated storage area network ("SAN") which communicates data between a computing device 110 and one or more storage devices 130A, 130N, but does not communicate data between different types of devices. Alternatively, the network 120 communicates data between the storage devices 130A, 130N and the computing device 110 as well as data between the computing device 110 and other devices, such as other computing devices, so that the network 120 operates as a SAN and as a file sharing network.

The storage devices 130A, 130N comprise non-volatile storage devices, such as hard disk drives, which exchange data with the computing device 110 via the network 120. Each storage device 130A, 130N is configured to execute commands having one or more formats. For example, the storage devices 130A, 130N are Serial AT Attachment ("SATA") devices executing AT Attachment ("ATA") commands to read or write data, provide identification information or perform other actions. However, SATA storage devices 130 are generally unable to execute commands having a different format, such as Small Computer System Interface ("SCSI") commands. Hence, to enable a process 112 using a SCSI command to interact with a SATA storage device 130 via the network 130, the storage device controller 115 generates an AoE request including an ATA command corresponding to the SCSI command as described below in conjunction with FIGS. 2-4.

Figure 2:
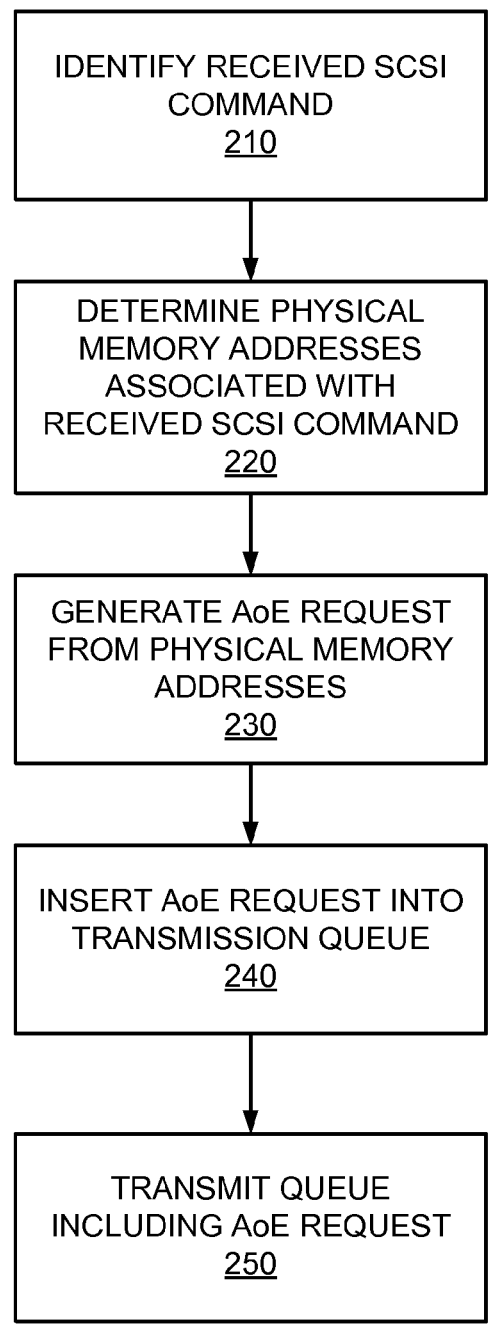
FIG. 2 is a flow chart of a method for transmitting an AT Attachment over Ethernet (AoE) request generated from a Small Computer System Interface (SCSI) command to a storage device according to one embodiment.

Generation of AT Attachment Over Ethernet ("AoE") Request From A Received Command And Data Communication Using AoE Request FIG. 2 is a flow chart of one embodiment of a method 200 for generating an AT Attachment over Ethernet (AoE) request generated from a Small Computer System Interface (SCSI) and transmitting the AoE request through a network 120. Although the method 200 is described using the example of generating an AoE request from a SCSI command, the steps of the method 200 may be used to generate different types of requests for transmission over a network 120 from a command having a first format while the data packet includes a corresponding command having a different second format.

Initially, a storage device controller 115 receives an SCSI command from a process 112 executed by a processor 111 included in a computing device 110. The received SCSI command identifies data for writing to a storage device 130, identifies data for retrieval from a storage device 130 or identifies another action to be performed by the storage device 130. For purposes of illustration, FIG. 2 describes communication with a Serial AT Attachment ("SATA") storage device 130, although in other embodiments the storage device 130 may have any format differing from the format used by the process 112, such as the SCSI format. The storage device controller 115 identifies 210 a command type associated with the received SCSI command. SCSI commands are communicated from the process 112 using a command descriptor block ("CDB") which includes a one byte operation code followed by five or more bytes of command-specific parameters, such as the logical block address ("LBA") of the storage device 130 used by the command. The storage device controller 115 identifies 210 the SCSI command type by extracting the opcode of the CDB.

The SCSI command received by the storage device controller 115 also includes a variable size scatter/gather list comprising a vector of pointers to addresses in a memory and sizes of the memory accessed or used by the SCSI command. In various embodiments, the scatter/gather list includes pointers to addresses in physical memory, addresses in virtual memory, page numbers and offsets or other data identifying one or more memory locations accessed by the SCSI command. The storage device controller 115 determines 220 the physical memory address associated with each pointer included in the scatter/gather list and generates an identifier for each physical memory address associated with a pointer in the scatter/gather list. For example, if the scatter/gather list includes pointers to 5 addresses in physical memory, the storage device controller 115 generates five identifiers, such as data packets, each identifying one of the physical memory addresses from the scatter/gather list. As another example, if the scatter/gather list includes 5 addresses in virtual memory, the storage device controller 115 determines 220 a physical memory address corresponding to each virtual memory address and generates five identifiers, each specifying a physical memory address corresponding to a virtual memory address from the scatter/gather list.

From the identified SCSI command type and determined addresses in physical memory, the storage device controller 115 generates 230 a network request including an AT Attachment ("ATA") command corresponding to the received SCSI command. For example, the storage controller 115 accesses stored data associating a SCSI command with one or more ATA commands to identify an ATA command associated with the command type identified 210 from the SCSI command. In one embodiment, the network request comprises an AT over Ethernet ("AoE") request including an Ethernet header, an AoE header, an ATA header and one or more identifiers associated with physical memory addresses from the scatter/gather list.

The AoE header includes a tag, a copy of which is stored by the storage device controller 115 and subsequently used to match the AoE request with a response, such as an AoE packet, received from a storage device 130. The tag is copied from the AoE request to the response without being modified so that the AoE request and a response include correlation information. When a response from a storage device 130 is received by the storage device controller 115, copies of tags stored by the storage device controller 115 are examined to identify an AoE request associated with the response.

The AoE header also includes a device identifier associated with the storage device 130 receiving the AoE request and allowing determination of an Ethernet address associated with the storage device 130. In one embodiment, the AoE header includes a major address and minor address associated with the storage device 130 receiving the AoE request, which allows an Ethernet address of the storage device 130 to be obtained by a broadcast message identifying the major address and minor address. For example, the AoE header allows determination of an Ethernet address associated with a storage device 130 at a physical location within a rack of storage devices 130 represented by the major address and the minor address. In one embodiment, a fixed length identifier is generated using the major address and minor address, such as a 24-bit identifier. If a fixed length identifier generated using the major address and the minor address is used with a logical block address having a specified length, the fixed length identifier is limited in the number of logical units that may be identified. For example, if a 24-bit fixed length identifier is generated using the major address and the minor address and an 8-byte logical block address is used to identify a target device, the 24-bit fixed length identifier is limited in its ability to identify target logical units exceeding two terabytes. In one embodiment, target logical units are identified by summing a logical block address associated with the command with the product of a logical unit included in a storage device 130 associated with the command and the identified logical unit by the maximum size logical unit capable of identification by the fixed length identifier. For example, if the fixed length identifier is 24 bits, certain target logical units are identified by summing the logical block address associated with a command with the product of a logical unit identifier from the storage device multiplied by two terabytes. The storage device controller 115 may store the device identifier of each storage device 130 to which an AoE request is transmitted and associate the tags of AoE commands transmitted to a storage device 130 with the corresponding device identifier. In one embodiment, the AoE header also includes error information.

The ATA header of the AoE request includes a command identifier describing an ATA command and may also include additional data for execution of the identified ATA command. In one embodiment, the physical memory addresses included in the AoE request identify regions of the storage device 130 from which data is retrieved or to which data is written. As another example, the AoE request includes one or more path identifiers, such as Media Access Control ("MAC") addresses associated with paths from the storage device controller 115 to the network 120, to allow execution of a "reserve-request" command providing dedicated access to the storage device 130 from the identified paths. Hence, the AoE request generated by the storage device controller 115 includes an ATA command corresponding to the received SCSI command and the physical memory addresses associated with the received SCSI command or other data associated with the SCSI command, allowing the storage device 130 receiving the AoE request to perform an ATA command functionally equivalent to the received SCSI command.

After generating 230 the AoE request, the storage device controller 115 inserts 240 the AoE request into a transmission queue. In one embodiment, to reduce congestion and more rapidly transmit AoE requests to a storage device, the storage device controller 115 includes different transmission queues each associated with different paths 122 for communicating data between the storage device controller 115 and the network 120. For example, the storage device controller 115 includes three transmission queues, each associated with a path 122A, 122B, 122C so that data in a transmission queue is transmitted to the network via the associated path 122A, 122B, 122C. In one embodiment, the storage device controller 115 determines the amount of data included in each transmission queue and inserts 240 the AoE request into the transmission queue having the lowest amount of data relative to the other transmission queues. This allows the storage device controller 115 to regulate the amount of data transmitted 250 along different paths 122A, 122B, 122C to minimize the time between AoE request generation and transmission 250 to the storage device. Insertion 240 of the AoE request into a transmission queue to mitigate data transmission congestion through the network 120 is further described below in conjunction with FIG. 5.

After transmitting 250 the AoE request using the path 122 associated with the transmission queue including the AoE request, the storage device 130 receiving the AoE request executes the ATA command from the AoE request. The storage device 130 then generates a response, such an AoE packet, indicating completion of the ATA command and/or including the data retrieved from the storage device 130. In the example described above, however, the process 112 from which the storage device controller 115 received the command uses SCSI formatted commands, while the AoE packet includes ATA formatted data, so the storage device controller produces a SCSI response, or other SCSI formatted data, for communication to the process 112.

Figure 3:
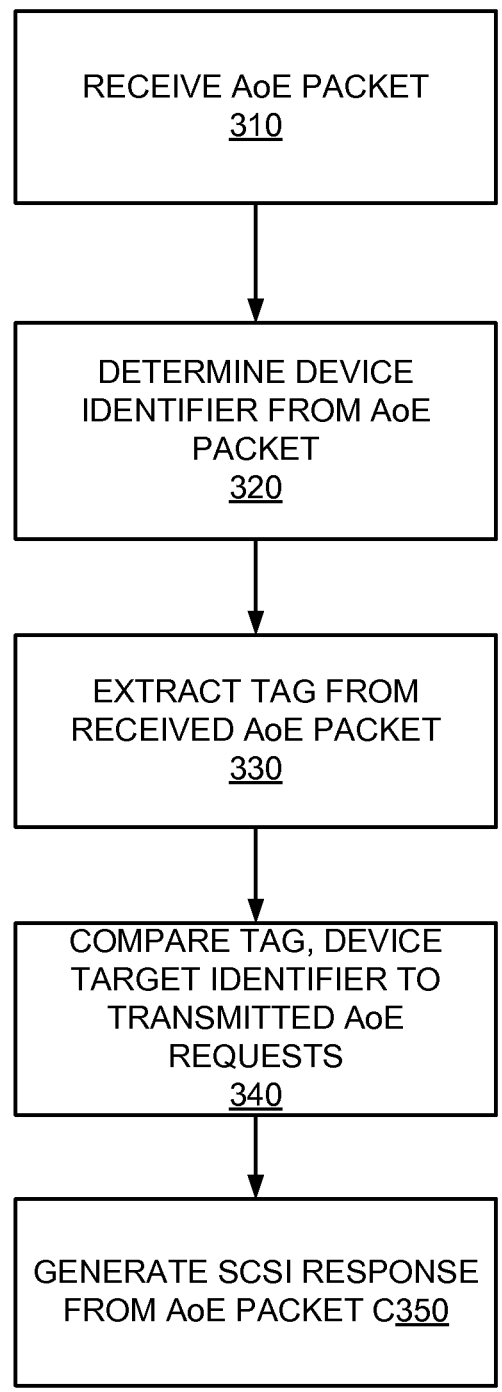
FIG. 3 is a flow chart of a method for generating a Small Computer System Interface (SCSI) response from a received AT Attachment over Ethernet (AoE) packet according to one embodiment.

FIG. 3 is a flow chart of one embodiment of a method 300 for generating a Small Computer System Interface (SCSI) response from a received AT Attachment over Ethernet (AoE) packet. Although the method 300 is described using the example of generating an SCSI response from an AoE packet received from a storage device 130, the steps of the method 300 may be used to generate a response in a first format that is different from a second format used by the data packet.

After the storage device 130 executes an ATA command included in an AoE request, the storage device controller 115 receives 310 an AoE packet from the storage device 130. For example, the AoE packet includes an acknowledgement message or includes data retrieved from the storage device 130. The AoE packet includes an Ethernet header, an AoE header, an ATA header and additional data, such as data retrieved from the storage device 130 in response to a read command. The storage device controller 115 determines 320 a device identifier from the AoE packet identifying the storage device 130 transmitting the AoE packet. For example, the storage device controller 115 extracts a major address and a minor address from the AoE header of the AoE packet which uniquely identifies the storage device 130 from which the AoE packet was received 310.

In one embodiment, when an AoE request is transmitted by the storage device controller 115, data identifying the AoE request is also stored by the storage device controller 115 and organized by a device identifier to which the AoE request is transmitted. For example, the storage device controller 115 stores a major address and minor address from the AoE requests. This allows the storage device controller 115 to maintain a record of the storage devices 130 to which AoE requests are sent. By determining 320 a device identifier from a received AoE packet, the storage device controller 115 identifies a subset of AoE requests likely to be associated with the received AoE packet.

As described above in conjunction with FIG. 2, a tag included in the AoE request is copied from the AoE request to the AoE packet without modification, correlating the AoE packet with the AoE request which caused generation of the AoE packet. Hence, the storage device controller 115 compares 340 the device identifier and tag from the AoE packet to stored data associated with transmitted AoE requests to identify an AoE request associated with the AoE packet. Responsive to receiving a response from a storage device 130, the storage device controller 115 examines locally-stored tags to identify a tag matching the tag included in the response. The storage device controller 115 generates 350 a SCSI response based on the AoE packet which is formatted based on the SCSI command associated with the AoE request having the tag matching the tag included in the AoE packet.

For example, after determining 320 the device identifier from an AoE packet, the storage device controller 115 identifies AoE requests previously transmitted to the determined device identifier by locating the device identifier from locally-stored device identifiers. The storage device controller 115 then extracts 330 a tag from the AoE header of the AoE packet and compares 340 the extracted tag to AoE requests previously transmitted to the determined device identifier. A previously transmitted AoE request associated with a tag matching the extracted tag is identified as the AoE request associated with the AoE packet. For example, the tag allows the storage device 115 to identify a "read" command associated with data received from the storage device 130. The storage device controller 115 includes data from the AoE packet in a response to the "read" command which has a format corresponding to the format of the "read." The generated response is communicated by the storage device controller 115 to the process 112 associated with the "read" command. This allows a process 112 using commands having a first format to execute those commands on a storage device 130 which is configured to execute commands and communicate data in a different, second, format.

Figure 4:
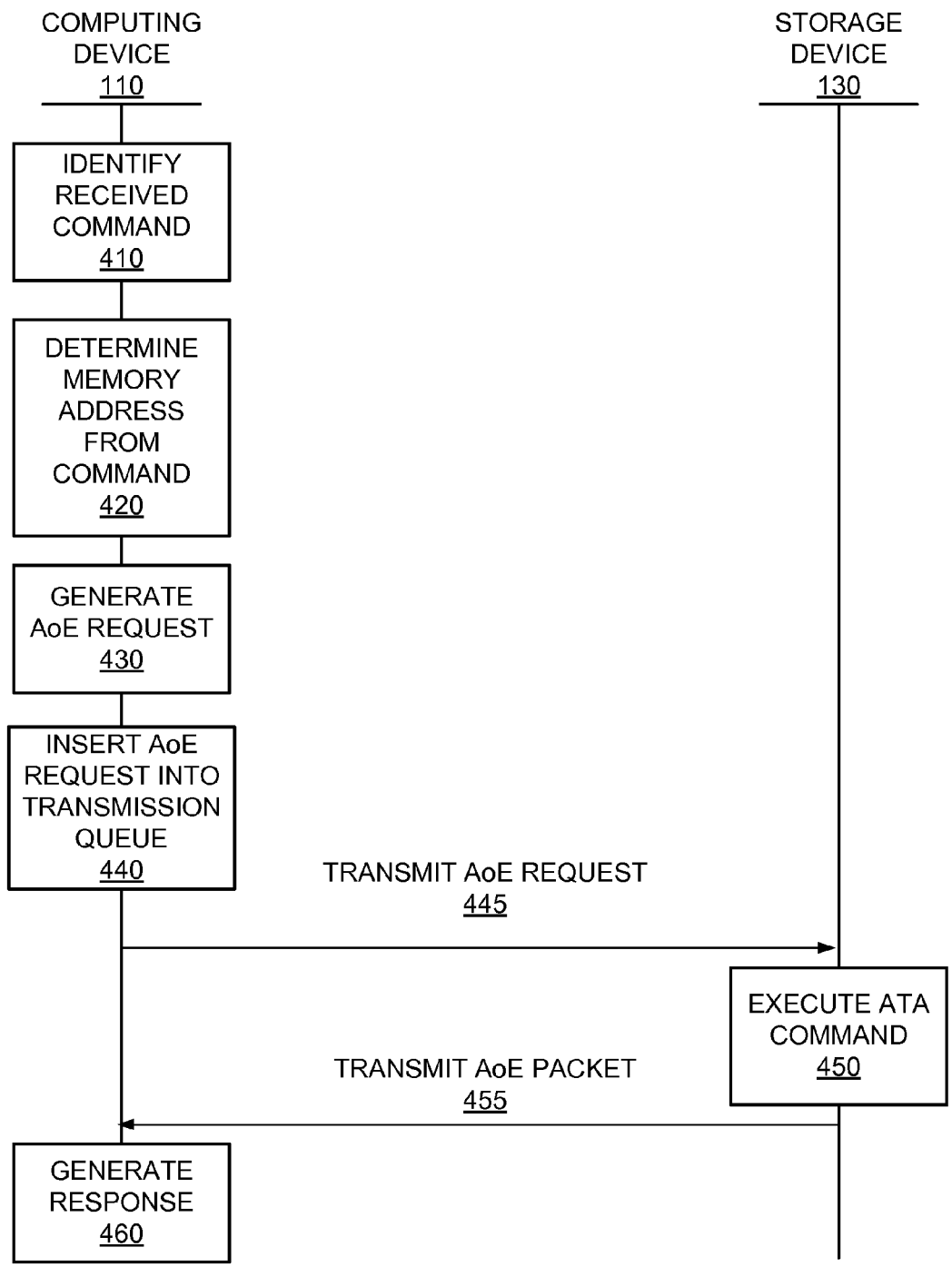
FIG. 4 is an event diagram of a computing device communicating with a storage device using an AT Attachment over Ethernet (AoE) request generated from a Small Computer System Interface (SCSI) command according to one embodiment.

To further illustrate operation of the methods 200, 300 described above, FIG. 4 shows an event diagram describing data flow between a computing device 110 and a storage device 130. For simplicity, FIG. 4 shows generation of an AT Attachment over Ethernet ("AoE") request by a computing device 110 for use by a single storage device 130, although in other embodiments, the AoE request may be transmitted to multiple storage devices 130.

Initially, a storage device controller 115 in the computing device 100 identifies 410 a command type of a SCSI command received from a process 112 executed by a processor 110 included in the computing device 100. In one embodiment, the storage device controller 115 identifies 410 the command type by extracting an opcode from the command. The storage device controller 115 also receives a scatter/gather list having a vector of pointers to addresses in a memory and sizes of the memory accessed or used by the SCSI command. From the scatter/gather list, the storage device controller 115 determines 420 physical memory addresses associated with each pointer in the scatter/gather list. In one embodiment, the storage device controller 115 generates an identifier associated with each physical memory address determined 420 from the scatter/gather list and associates the identifiers with the command type.

From the identified command and the physical memory addresses, the storage device controller 115 generates 430 an AT over Ethernet ("AoE") request including an AT Attachment ("ATA") command corresponding to the identified SCSI command type. For example, the storage controller 115 retrieves one or more ATA commands associated with the identified SCSI command. The generated AoE request includes an Ethernet header, an AoE header, an ATA header and data identifying the physical memory addresses determined from the scatter/gather list or other data. The AoE request also includes an ATA command corresponding to the received SCSI command and data associated with the received SCSI command, allowing the storage device 130 receiving the AoE request to perform an ATA command which is functionally equivalent to the received SCSI command.

Additionally, the AoE request includes a device identifier associated with a storage device 130, such as a major address and minor address associated with the storage device 130. The storage device controller 115 also locally stores the device identifier to maintain a record of storage devices 130 to which AoE requests are transmitted. The AoE header of the generated AoE request also includes a tag, a copy of which is also stored by the storage device controller 115 and associated with the device identifier from the AoE request. Hence, the storage device controller 115 stores a device identifier and a copy of a tag from each AoE request transmitted to the device identifier, allowing subsequent identification of AoE requests transmitted to various storage devices 130.

In one embodiment, to minimize latency in transmission of the AoE request from the computing device 110 to the storage device 130, the storage device controller 115 includes different transmission queues each associated with a different path 122 coupling the storage device controller to the network 120. For example, if the storage device controller 115 has three connections to the network 120, the storage device controller 115 includes three transmission queues, each associated with a path 122. To reduce the time for transmission of the AoE request to the target device 130, the storage device controller 115 may determine the amount of data in each transmission queue and insert 440 the AoE request into the transmission queue having the lowest amount of data relative to the other transmission queues. The path 122 associated with the transmission queue including the AoE request is used to transmit 445 the AoE request from the storage device controller 115 to the storage device 130 associated with the device identifier.

Upon receiving the AoE request from the network 120, the storage device 130 executes 450 the ATA command included in the AoE request. For example, data included in the AoE request is written to the storage device 130 or data is read from one or more physical addresses specified by the AoE request. After executing 450 the ATA command in the AoE request, the storage device 130 generates an acknowledgement message indicating successful completion of the command or including data obtained responsive to the AoE request. To communicate the acknowledgement message or data to the computing device 110, the storage device 130 generates an AoE packet, or other suitable response. Like the AoE request, the AoE packet includes an Ethernet header, an AoE header, an ATA header and additional data, such as data retrieved from the storage device 130 in response to a read command. The storage device 130 transmits 455 the AoE packet to the computing device through the network 120 and a path 122.

Responsive to receiving the AoE packet via a path 122, the storage device controller 115 in the computing device 110 generates 460 from the AoE packet a SCSI response for communication to the process 112. In one embodiment, the storage device controller 115 extracts a device identifier and a tag from the AoE packet and compares the device identifier and tag to locally stored device identifiers and the copies of tags associated with each locally stored device identifier. After determining the SCSI command associated with a combination of a device identifier and a tag which matches data from the AoE packet, the storage device controller 115 generates 460 a response having a format usable by the process 112, such as a SCSI formatted message.

Hence, the storage device controller 115 enables a process 122 using SCSI commands to communicate with a storage device 130 through a network 120 using AoE requests. The storage device controller 115 identifies an ATA command corresponding to a SCSI command received from the process 112 and uses the ATA command to generate an AoE request to communicate the ATA command to the storage device 130. By generating AoE requests from SCSI commands, the storage device controller 115 streamlines communication with the storage device 130 by reducing the amount of overhead data, increases the security of the transmitted data and increases the number and type of storage devices 130 suitable for use by the process 112.

Figure 5:
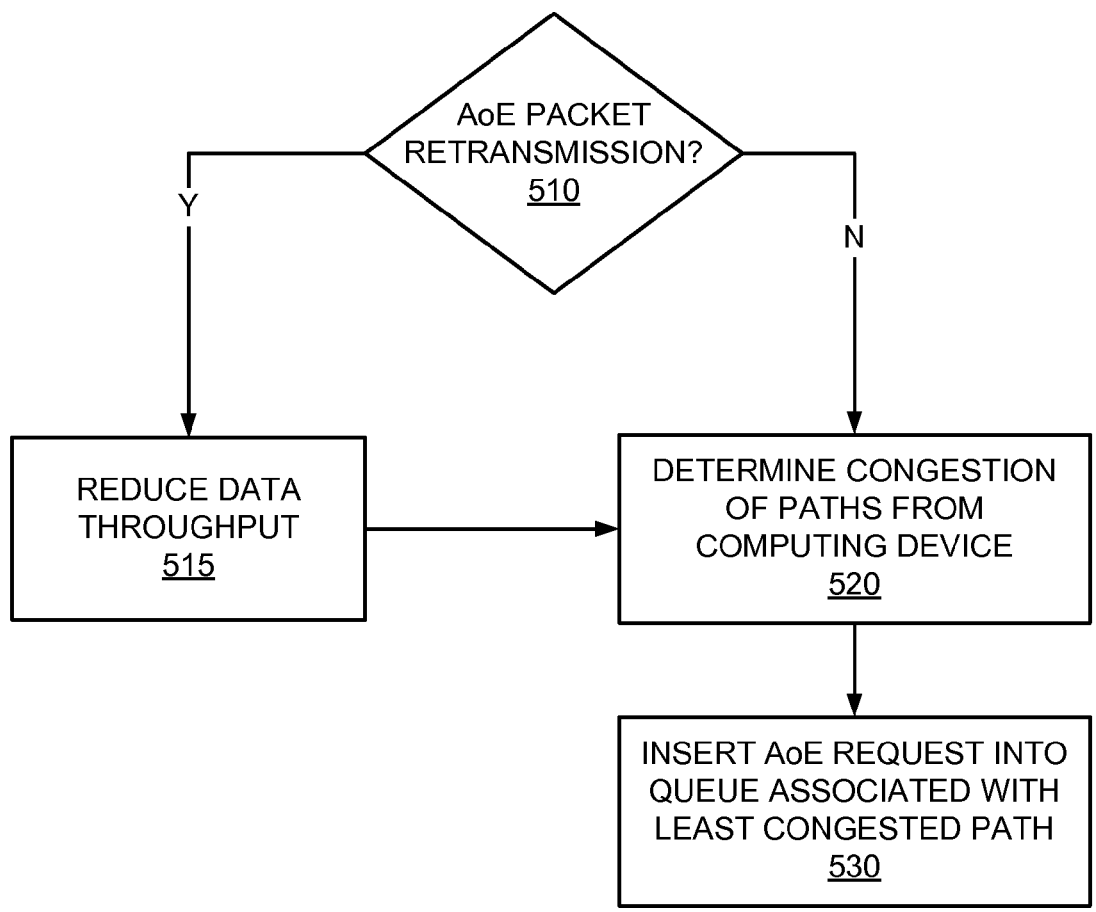
FIG. 5 is a flow chart of a method for inserting an AT Attachment over Ethernet (AoE) request into a queue for transmission to a storage device according to one embodiment.

Congestion Management of AT Attachment Over Ethernet ("AoE") Request Transmission To expedite transmission of an AT Attachment over Ethernet ("AoE") request generated from a Small Computer System Interface ("SCSI"), the storage device controller 115 may modify which path 122 is used to transmit the AoE packet to a network 120 based on one or more criteria. FIG. 5 is a flow chart of one embodiment of a method 240 for inserting an AT Attachment over Ethernet (AoE) request into a queue for transmission to a storage device 120 to reduce transmission latency.

After generating an AoE request, the storage device controller 115 determines 510 whether the AoE request is a retransmission of a previously transmitted AoE request. In one embodiment, the storage device controller 115 determines 510 whether the AoE request includes error data indicating that the AoE request is a retransmission. For example, the storage device controller 115 determines 510 whether error data in the AoE request has value associated with retransmission.

Various circumstances may cause retransmission of an AoE request. In one embodiment, the storage device controller 115 stores data describing the round trip time from transmission of an AoE request to receipt of an AoE packet from a storage device 130 and data describing deviations in the round trip times of various AoE requests. The round trip time and round trip time deviation are used to generate a transmission time value associated with the AoE request which is compared to a time threshold. If the transmission time value equals or exceeds the time threshold, the AoE request is retransmitted.

If the storage device controller 115 determines 510 the AoE request is a retransmitted AoE request, the storage device controller 115 reduces 515 a throughput value which specifies a number of AoE requests transmitted by the storage device controller 115 or transmitted by a transmission queue in the storage device controller 115. Reducing 515 the number of AoE requests transmitted using a queue allows the storage device controller 115 to reduce the likelihood that subsequent AoE requests are retransmitted. After reducing 515 the throughput value, the storage device controller 115 determines 520 the congestion of multiple paths 122 from the storage device controller 115 to the network 120 by determining the number of AoE requests or other data included in transmission queues associated with multiple paths 122. For example, the storage device controller 115 determines 520 the congestion of each path 122 by determining the amount of data included in each transmission queue. The storage device controller 115 then inserts 530 the AoE request into the queue having the relative minimum amount of AoE requests, or other data.

Responsive to determining 510 that the AoE request is not a retransmitted AoE request, the storage device controller 115 determines 520 the congestion of each path 122 from the storage device controller 115 to the network 120 and inserts 530 the AoE request into a transmission queue having the fewest number of AoE requests or other data as described above. Hence, the storage controller 115 regulates the amount of data transmitted by different paths 122 to expedite transmission while also reducing the likelihood of AoE request retransmission.

Figure 6:
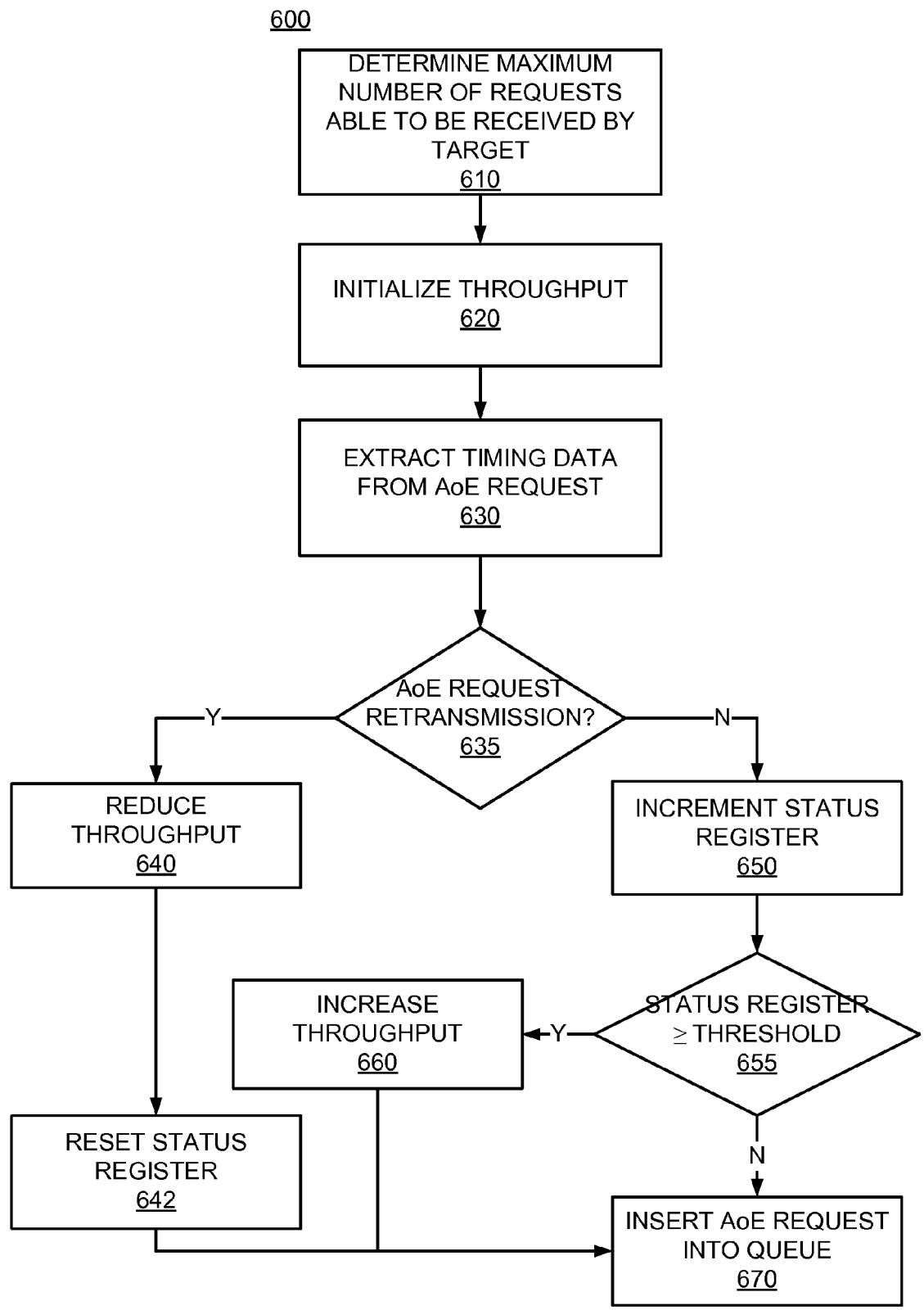
FIG. 6 is a flow chart of a method for controlling congestion of AT Attachment over Ethernet (AoE) request transmission through a network to a storage device according to one embodiment.

FIG. 6 is a flow chart of an embodiment of a method 600 for further controlling congestion of AT Attachment over Ethernet ("AoE") request transmission through a network 120 to a storage device 130. In one embodiment, to reduce the likelihood of retransmission of AoE requests the storage device controller 115 modifies the number of AoE requests transmitted to a storage device 130. Modifying AoE transmission volume accounts for attributes of the storage device 130, allowing customization of the number of AoE requests transmitted to different storage devices 130.

The storage device controller 115 receives configuration data from a storage device 130 when the storage device controller 115 initially detects that the storage device 130 is coupled to the network 120 or when the storage device controller 115 initially transmits data to the storage device 130. From this initial configuration data, the storage device controller 115 determines 610 a maximum number of AoE requests the storage device 130 is able to receive and process. In one embodiment, the configuration data from the storage device 130 specifies a maximum total number of AoE requests, indicating the number of AoE requests from multiple computing devices 110 that the storage device is able to receive and process with minimal delay. When multiple computing devices 110 transmit commands to the storage device, number of AoE requests the storage device controller 115 is able to transmit to the storage device 130 is influenced by the number of AoE requests the storage device 130 receives from additional computing devices 110.

Based on the determined maximum number of AoE requests which the storage device 130 is able to receive, the storage device controller 115 initializes 620 a throughput value specifying the number of AoE requests transmitted by the storage device controller 115 to the storage device 130. In one embodiment, the throughput value is initialized 620 to the number of AoE requests from initial configuration data received from the storage device 130. For example, the throughput value is initialized 620 to the maximum number of AoE requests which the storage device 130 is able to receive, maximizing the number of AoE requests transmitted to the storage device 130. The storage device controller 115 then extracts 630 timing data from an AoE request. In one embodiment, the storage device controller 115 stores data describing the round trip time from transmission of an AoE request to receipt of an AoE packet from a storage device 130 and describing deviations in the round trip time associated with different AoE requests. The round trip time and round trip time deviation are extracted 630 from the AoE request and used by the storage device controller 115 to generate a transmission time value associated with the AoE request. The transmission time value depends on the round trip time and the round trip time deviation so that the likelihood of erroneously identifying a retransmission is minimized. In one embodiment, the round trip time is multiplied by a first constant and added to the product of a second constant multiplied by the round trip time deviation to calculate the transmission time value. For example, the transmission time value may be calculated using 2(round trip time)+8(round trip time deviation). To determine 635 whether the AoE request is to be retransmitted, the storage device controller 115 compares the transmission time value associated with the AoE request to a time threshold, and if the transmission time value equals or exceeds the time threshold, the storage device controller 115 determines 635 that the AoE request is to be retransmitted.

Responsive to determining 635 that the AoE request is to be retransmitted, the storage device controller 115 reduces 640 the throughput value by a specified amount. For example, if an AoE request is retransmitted, the storage device controller 115 reduces 640 the throughput value by one AoE request. By reducing 640 the throughput value in response to AoE request retransmission, the storage device controller 115 reduces the likelihood of retransmission of subsequent AoE requests by transmitting fewer AoE requests to the storage device 130. The storage device controller 115 also resets 642 a status register to a predetermined value, such as zero. The status register is incremented 650 responsive to a successful AoE packet transmission, allowing the storage device controller 115 to maintain a record of successful AoE request transmissions, and is reset to a predetermined value when an AoE packet is retransmitted. After reducing 640 the throughput value, the storage device controller 115 inserts 670 the AoE request into a transmission queue, as described above in conjunction with FIGS. 2 and 5.

Responsive to determining 635 that the AoE request is not to be retransmitted, the AoE request increments 650 a status register by a specified amount. For example, after determining 635 not to retransmit the AoE request, the storage device controller 115 increments 650 the status register by one. Hence, for each successful AoE request transmission, the status register is incremented 650 by a specified amount. The storage device controller 115 then determines 655 whether the status register, after being incremented 650, exceeds a threshold value. If the incremented status register equals or exceeds the threshold value, the storage device controller 115 increases 660 the throughput value by a specified amount. For example, if the incremented status register equals or exceeds a specified value, such as five, the storage device controller 115 increases 660 the throughout value by one, so that an additional AoE request is transmitted to the storage device 130 after successful transmission of a specified number of AoE requests. After increasing 660 the throughput value, or if the storage device controller 115 determines 655 that the status register does not equal or exceed the threshold value, the storage device controller 115 inserts 670 the AoE request into a transmission queue, as described above in conjunction with FIGS. 2 and 5.

In one embodiment, the method 600 described in conjunction with FIG. 6 is executed by a process 112 executed by the processor 110 or by a device embedded within the storage device controller 115. The process 112 performs the method 600 at predefined intervals, such as after 100 millisecond intervals, to periodically determine the success with which the storage device controller 115 transmits AoE requests to a storage device 130. Additionally, executing the method 600 at predefined intervals regularly updates the status register, allowing the storage device controller 115 to modify the throughput value to increase or decrease the AoE requests transmitted to the storage device at regular intervals. For example, if the method 600 is executed at 100 millisecond intervals, and the status register threshold has a value of 5, if AoE requests are successfully transmitted for five consecutive 100 millisecond intervals, the throughput may be increased 600 at a maximum rate of once every 500 milliseconds.

In various embodiments, the steps depicted in the methods 200, 300, 240, 600 described above with respect to FIGS. 2, 3, 5 and 6 and are implemented by instructions for performing the described actions embodied or stored within a computer readable storage medium, such as the memory 117 or the storage device controller 115, which are executable by a processor 111. Those of skill in the art will recognize that the methods 200, 300, 240, 600 may be implemented in embodiments of hardware and/or software or combinations thereof. Moreover, other embodiments of the methods 200, 300, 240, 600 may include different and/or additional steps than the ones shown in FIGS. 2, 3, 5 and 6.

Upon reading this disclosure, those of skill in the art will appreciate still additional alternative designs for a method for generating a network request including a command having a second format from a command having a first format. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the present invention.

What is claimed is:

1. A method for generating a network request including a second command from a first command, the method comprising:

identifying a command type associated with the first command having a first format;

determining one or more physical memory addresses associated with the first command;

generating one or more identifiers having a second format, each identifier associated with at least one of the physical memory addresses associated with the first command;

identifying the second command having the second format, the second command associated with the identified command type;

generating the network request at a computing device located across a network from a storage device configured to use the second format, the network request including a device identifier associated with the storage device, a tag, the second command and the one or more identifiers having the second format and being associated with the physical memory addresses associated with the first command having the first format; and storing the network request in one of a plurality of transmission queues for transmission over the network from the computing device to the storage device, wherein storing the network request in a transmission queue comprises:

storing a copy of the device identifier associated with the storage device;

storing a copy of the tag;

associating the copy of the tag with the copy of the device identifier;

determining a congestion level associated with each of the transmission queues;

identifying one of the transmission queues having a minimum congestion level when compared to the remaining transmission queues in the plurality of transmission queues; and storing the network request in the transmission queue from the plurality of transmission queues having the minimum congestion level.

2. The method of claim 1 wherein the first format comprises a Small Computing System Interface ("SCSI") format.

3. The method of claim 1 wherein the second format comprises an AT Attachment ("ATA") format.

4. The method of claim 1, wherein the network request comprises an AT Attachment over Ethernet ("AoE") request.

5. The method of claim 1, wherein identifying the command type associated with the first command comprises:

determining an opcode included in the first command.

6. The method of claim 1, wherein generating the identifier associated with the at least one physical memory address associated with the first command comprises:

determining a scatter/gather list associated with the first command;

identifying a pointer included in the scatter/gather list;

determining a physical memory address associated with the pointer; and generating a first identifier associated with the physical memory address associated with the pointer.

7. The method of claim 1, wherein the device identifier comprises a major address and a minor address associated with the storage device.

8. The method of claim 1, further comprising:

receiving a network response comprising a response tag;

comparing the response tag to the tag of the network request;

determining that the tag matches the response tag; and associating the network response with the network request.

9. A computer readable storage medium for storing a computer program product including instructions executable by a processor of a computing device to perform a computer implemented method for generating a network request including a second command from a first command, the method comprising:

identifying a command type associated with the first command having a first format;

determining one or more physical memory addresses associated with the first command;

generating one or more identifiers having a second format, each identifier associated with at least one of the physical memory addresses associated with the first command;

identifying the second command having the second format, the second command associated with the identified command type;

generating the network request at a computing device located across a network from a storage device configured to use the second format, the network request including a device identifier associated with the storage device, a tag, the second command and the one or more identifiers having the second format and being associated with the physical memory addresses associated with the first command having the first format; and storing the network request in one of a plurality of transmission queues for transmission over the network from the computing device to the storage device, wherein storing the network request in a transmission queue comprises:

storing a copy of the device identifier associated with the storage device;

storing a copy of the tag;

associating the copy of the tag with the copy of the device identifier;

determining a congestion level associated with each of the transmission queues;

identifying one of the transmission queues having a minimum congestion level when compared to the remaining transmission queues in the plurality of transmission queues; and storing the network request in the transmission queue from the plurality of transmission queues having the minimum congestion level.

10. The computer readable storage medium of claim 9, wherein the first format comprises a Small Computing System Interface ("SCSI") format.

11. The computer readable storage medium of claim 9 wherein the second format comprises an AT Attachment ("ATA") format.

12. The computer readable storage medium of claim 9, wherein the network request comprises an AT Attachment over Ethernet ("AoE") request.

13. The computer readable storage medium of claim 9, wherein identifying the command type associated with the first command comprises:

determining an opcode included in the first command.

14. The computer readable storage medium of claim 9, wherein generating the identifier associated with the at least one physical memory address associated with the first command comprises:

determining a scatter/gather list associated with the first command;

identifying a pointer included in the scatter/gather list;

determining a physical memory address associated with the pointer; and generating a first identifier associated with the physical memory address associated with the pointer.

15. The computer readable storage medium of claim 9, wherein the device identifier comprises a major address and a minor address associated with the storage device.

* * * * *